United States Patent [19]

van der Lely

[11] 4,167,976

[45] Sep. 18, 1979

[54] SOIL CULTIVATING IMPLEMENTS

[76] Inventor: Cornelis van der Lely, 7, Brüschenrain, Zug, Switzerland

[21] Appl. No.: 862,521

[22] Filed: Dec. 20, 1977

[30] Foreign Application Priority Data

Dec. 24, 1976 [NL] Netherlands .......................... 7614385

[51] Int. Cl.² ............................................. A01B 19/06
[52] U.S. Cl. ..................................... 172/68; 172/102;
 172/125; 172/713; 172/762
[58] Field of Search .................. 172/57, 691, 763, 713,
 172/97, 102, 48, 68, 125, 762

[56] References Cited

U.S. PATENT DOCUMENTS

| 712,221 | 10/1902 | Wallis | 172/691 |
|---|---|---|---|
| 924,993 | 6/1909 | Johnson | 172/763 X |
| 1,033,574 | 7/1912 | Freeman | 172/713 |

FOREIGN PATENT DOCUMENTS

| 257223 | 9/1967 | Austria | 172/97 |
|---|---|---|---|
| 119184 | 11/1970 | Denmark | 172/102 |
| 38919 | 4/1887 | Fed. Rep. of Germany | 172/102 |
| 1291158 | 3/1969 | Fed. Rep. of Germany | 172/48 |
| 2042884 | 10/1971 | Fed. Rep. of Germany | 172/102 |
| 257707 | 3/1928 | Italy | 172/102 |
| 22398 | 10/1930 | Netherlands | 172/97 |

*Primary Examiner*—Paul E. Shapiro
*Attorney, Agent, or Firm*—William B. Mason; Penrose Lucas Albright

[57] ABSTRACT

A soil cultivating implement has elongated transverse carriers that mount tines and corresponding eccentric mechanisms that are driven by a common shaft to orbit the tines through circular paths. Each carrier is pivoted to the frame by arms and springs suspend the carriers from the frame. During operation, the tines are moved smoothly, up and down, and torsion affects on the carriers are reduced. The tines can be connected to the carriers by quick-release cotter pins or bolts.

30 Claims, 7 Drawing Figures

FIG. 1

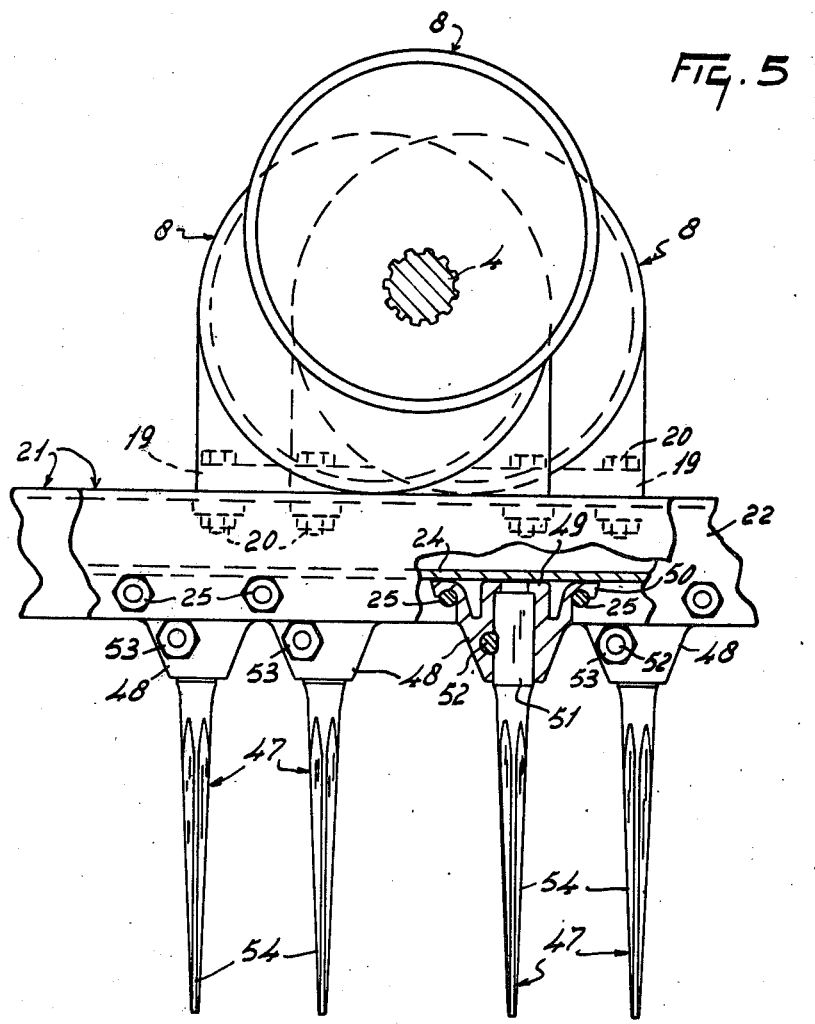

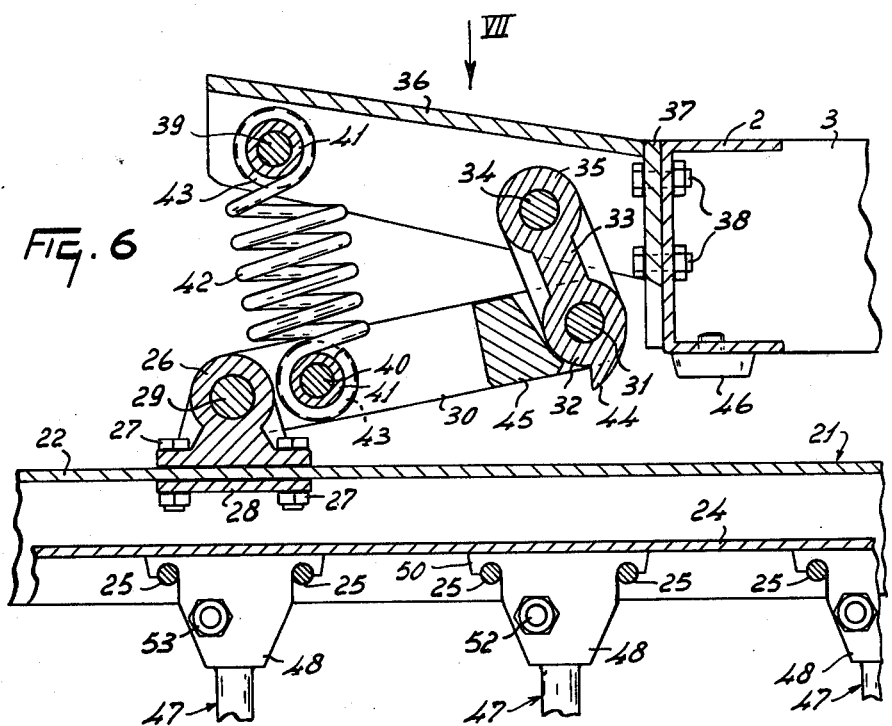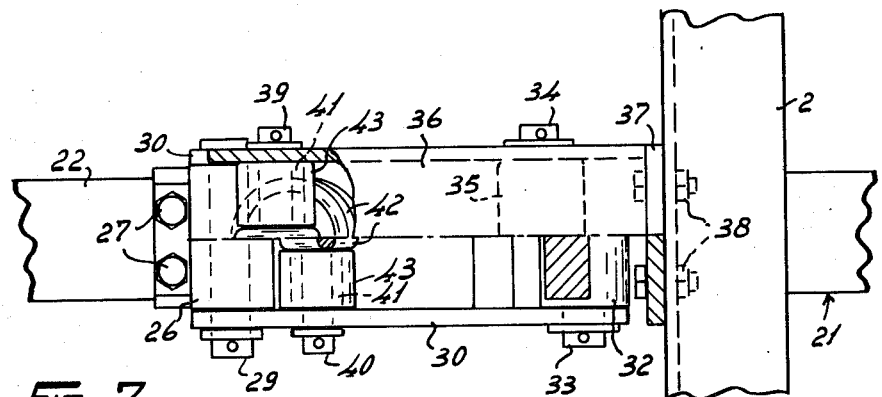

SOIL CULTIVATING IMPLEMENTS

This invention relates to soil cultivating implements or machines of the kind which comprise a frame and a plurality of power-drivable soil working members that are arranged on at least two elongate carriers. The expression "implement(s) or machine(s)" will be shortened to "Implement(s)" alone throughout the remainder of this specification for the sake of brevity.

According to one aspect of the invention, there is provided a soil cultivating implement of the kind set forth, wherein each carrier is movably connected to said frame by an eccentric mechanism and by at least one freely pivotable joint.

Figure 2:
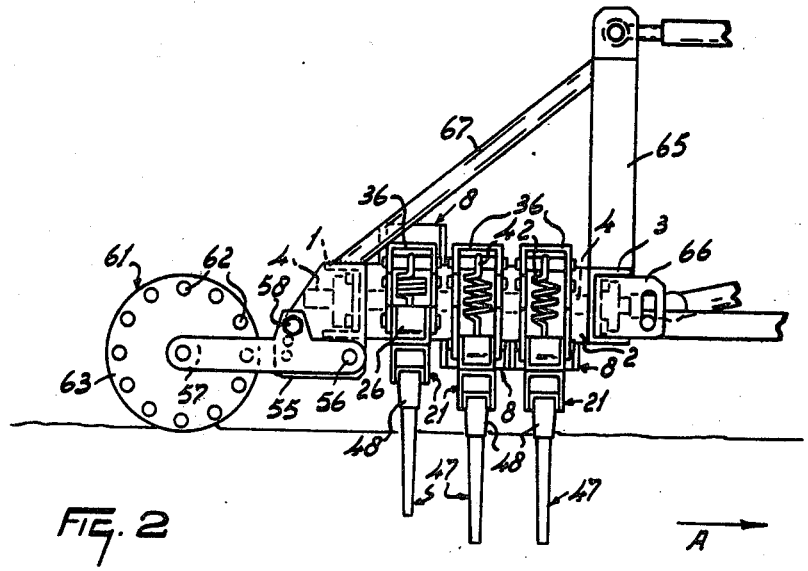
Figure 3:
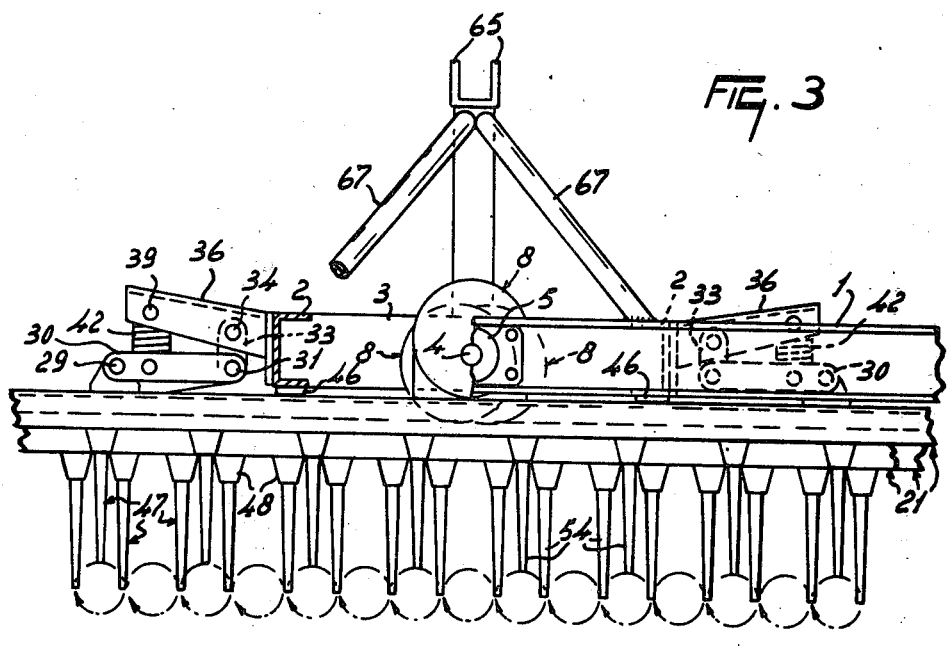
Figure 4:
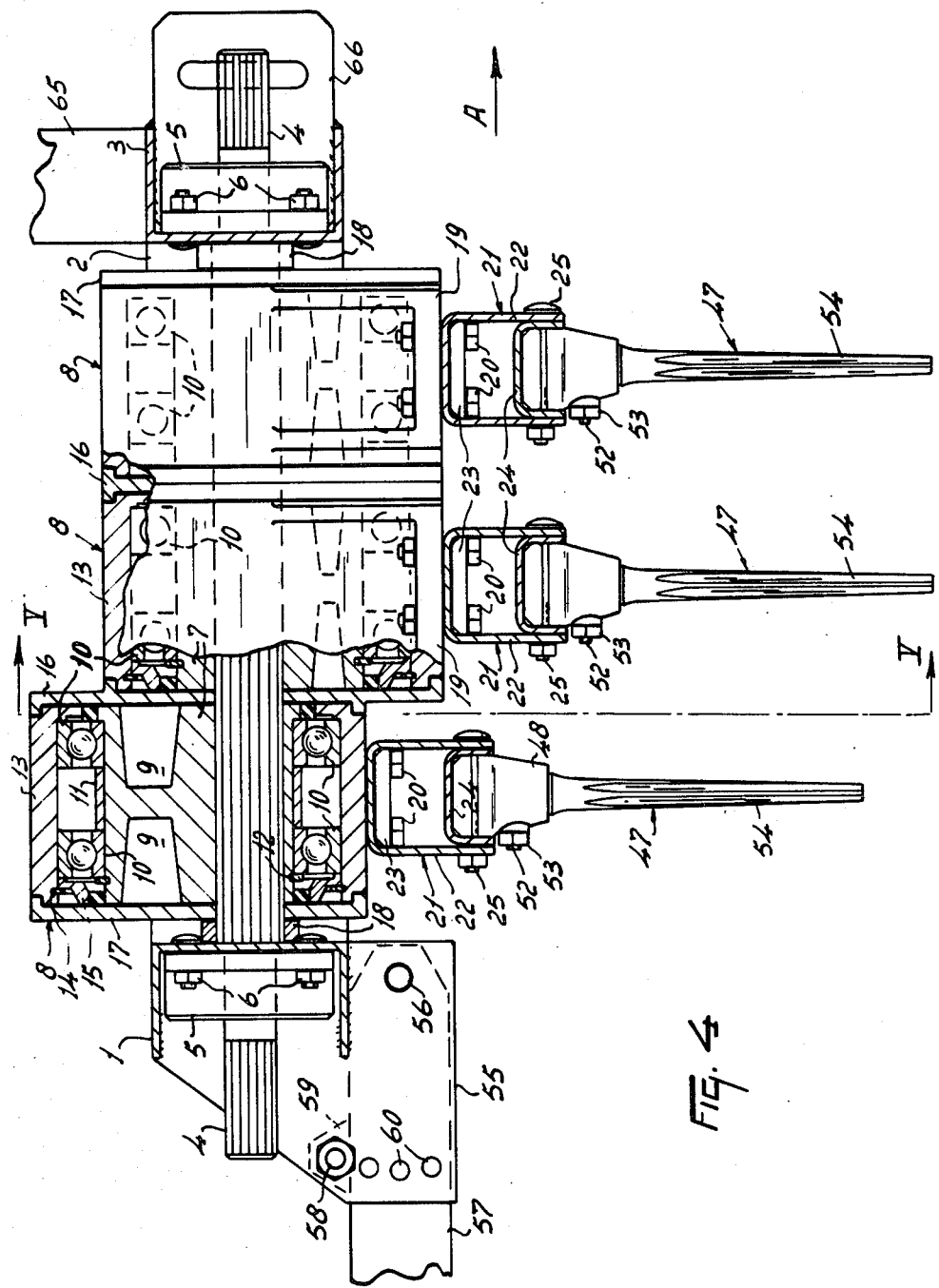

For a better understanding of the invention, and to show how the same may be carried into effect, reference will now be made, by way of example, to the accompanying drawings, in which:

Figure 1:
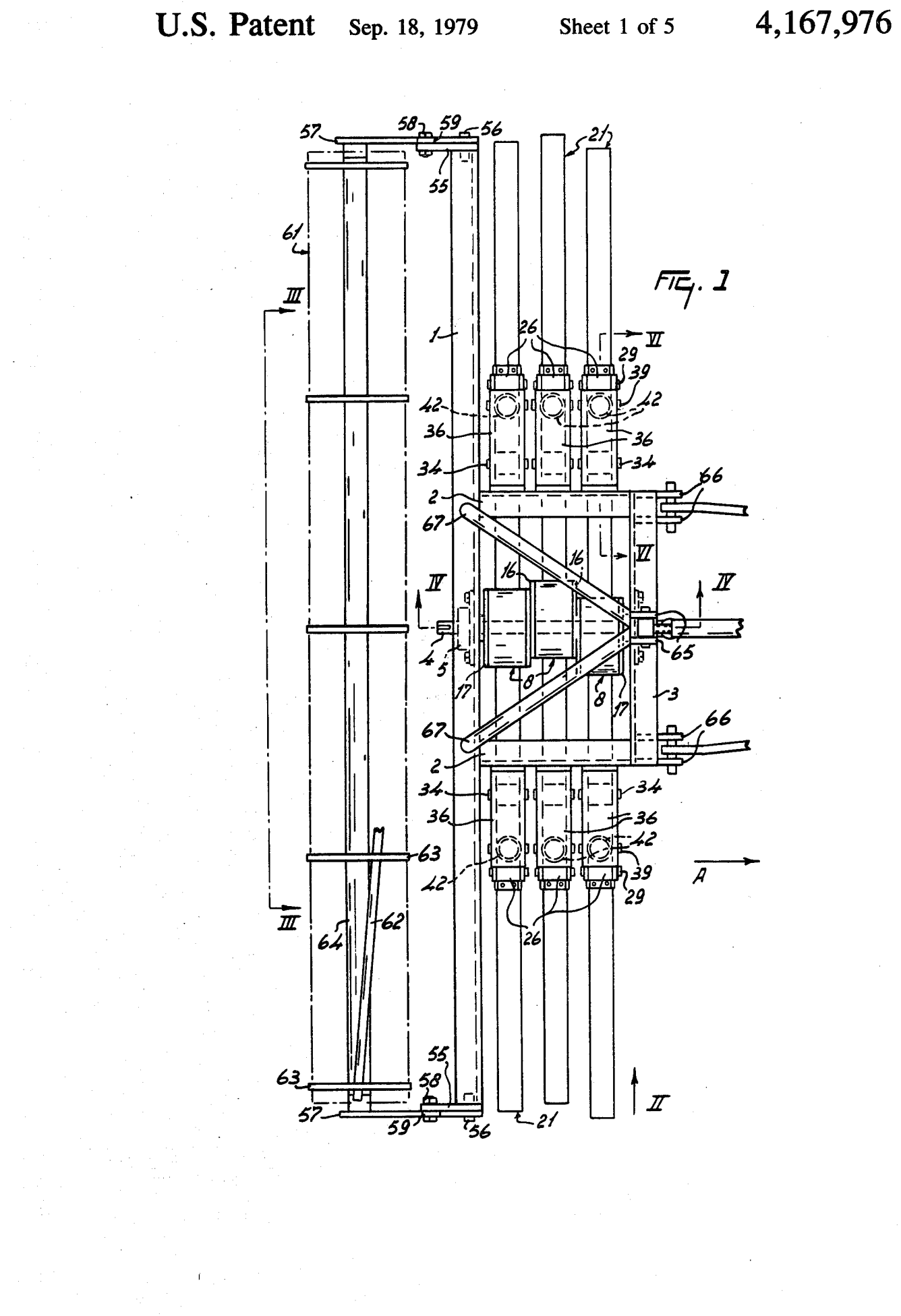

FIG. 1 is a plan view of a soil cultivating implement in accordance with the invention connected to the rear of an agricultural tractor, FIG. 2 is a side elevation as seen in the direction indicated by an arrow II in FIG. 1, FIG. 3 is a rear elevation as seen in the direction indicated by arrows III—III in FIG. 1 but with the omission of a roller of the implement to avoid concealing other parts, FIG. 4 is a section, to an enlarged scale, taken on the line IV—IV in FIG. 1, FIG. 5 is a section taken on the line V—V in FIG. 4, FIG. 6 is a section, to an enlarged scale, taken on the line VI—VI in FIG. 1, and FIG. 7 is a plan view, with certain items partially cut away, as seen in the direction indicated by an arrow VII in FIG. 6.

Referring to the drawings, the soil cultivating implement that is illustrated comprises a beam 1 of channel-shaped cross-section that extends substantially horizontally transverse, and usually (as illustrated) substantially perpendicular, to the intended direction of operative travel of the implement that is indicated in FIGS. 1, 2 and 4 of the drawings by an arrow A. Two beams 2 that are also of channel-shaped cross-section project perpendicularly forwards, with respect to the direction A, from locations that are spaced by equal distances from the midpoint of the beam 1, said beams 2 being in parallel or substantially parallel relationship with one another and being interconnected, at their leading ends, by a further frame beam 3 that, once again, is of channel-shaped cross-section. The frame beam 3 is thus parallel or substantially parallel to the frame beam 1 but it will be apparent from FIG. 1 of the drawings that it has a considerably shorter length than the frame beam 1 being in register, in the direction A, only with a central region of that beam. It can be seen in FIGS. 2 and 3 of the drawings that all four of the channel-shaped cross-section frame beam 1, 2 and 3 are arranged with their webs or bases substantially vertically disposed, the limbs projecting substantially horizontally from the upper and lower edges of those webs or bases. The limbs of the frame beam 1 project rearwardly with respect to the direction A from its web or base whilst the limbs of the frame beam 3 project forwardly with respect to that direction from its web or base. The limbs of the two frame beams 2 both project inwardly towards the center of the implement from their respective webs or bases.

Holes which are substantially horizontally aligned in the direction A are formed through the midpoints of the webs or bases of the parallel or substantially parallel rear and front frame beams 1 and 3 and a rotary shaft 4 extends lengthwise through said holes to project both forwardly beyond the front frame beam 3 and rearwardly behind the back frame beam 1, the projecting portions of the shaft 4 being splined or keyed. Substantially horizontally aligned bearings (not visible) for the shaft 4 are contained in bearing housings 5 that are releasably secured to the webs or bases of the front and rear frame beams 3 and 1, between the limbs of those beams, by bolts 6 (FIG. 4). That portion of the shaft 4 which extends between the bearings that are contained in the two housings 5 is axially splined throughout substantially the whole of its length for cooperation with three eccentric mechanisms 8 that adjoin one another along the shaft 4 in the direction A. Each of the three eccentric mechanisms 8 comprises a corresponding eccentric disc 7 that is formed with an internally splined eccentric bore which co-operates with the axial splines on the shaft 4. The three discs 7 are angularly displaced by 120° around the longitudinal axis of the shaft 4 relative to one another as regards their eccentricities (see FIG. 5), each disc 7 being formed with a pair of opposed weight-reducing cavities 9 at that side of the shaft 4 at which its center of gravity would lie if it were of a uniform construction. The outer curved surface of each disc 7 is surrounded by the inner races of a corresponding pair of ball bearings 10, said inner races being maintained in their appointed spaced relationship by a corresponding ring 11 which also surrounds the outer curved surface of the disc 7 concerned. Each disc 7 is formed at its leading end, with respect to the direction A, with a small enlarged diameter shoulder and the inner race of the leading ball bearing 10, with respect to the same direction, abuts against that shoulder. The inner and outer races of the corresponding rear ball bearing 10, with respect to the direction A, abut against a circlip 12 whose inner edge is engaged in a groove formed in the outer curved surface of the disc 7 concerned.

The outer races of the two ball bearings 10 of each eccentric mechanism 8 are surrounded by the inner surface of a corresponding ring 13, each ring 13 being formed with an inwardly directed and stepped lip at the axial end thereof which is foremost with respect to the direction A. The outer race of the corresponding leading ball bearing 10 abuts against one of the steps of the inwardly directed lip of each ring 13. The inner curved surface of each ring 13 is formed, close to the rearmost end of that ring, with respect to the direction A, with a groove into which is entered the outer edge of a corresponding circlip 14. It can be seen in FIG. 4 of the drawings that each circlip 14 co-operates with the corresponding, and neighbouring, circlip 12 in retaining in its appointed position part of a corresponding profiled sealing ring 15. The anchored part of each sealing ring 15 engages the outer race of the corresponding rear ball bearing 10. Two blanking plates 16 are arranged between the otherwise adjoining first and second, and second and third, respectively, eccentric mechanisms 8 as considered in the direction A, the two blanking plates 16 having internally splined openings which co-operate with the external splines of the shaft 4. The blanking plates 16 principally extend perpendicular to the longitudinal axis of the shaft 4 but are formed with rims that engage in recesses at the axial ends of the outer curved surfaces of the corresponding rings 13. The co-operation is not sufficient to interfere with rotation of the discs 7 inside the corresponding rings 13 but acts positively to maintain the rings 13 in their appointed axially registering positions with respect to said discs 7. Further blanking plates 17 surround the shaft 4 in front of the leading mechanism 8 with respect to the direction A and behind the rearmost mechanism 8 relative to the same direction, the blanking plates 17 being of simpler shape than the plates 16 since each of them has to co-operate only with a single one of the mechanisms 8. However, the two plates 17 each have an outer rim that co-operates with the corresponding ring 13 in the same way, and for the same purpose, as has just been described for the rims of the plates 16. Front and rear spacing rings 18 surround the shaft 4 between the webs or bases of the beams 3 and 1 and the facing surfaces of the corresponding blanking plates 17 to maintain those blanking plates in their appointed positions relative to the neighbouring front and rear eccentric mechanisms 8.

Brackets 19 project downwardly from the bottom of each eccentric mechanism ring 13 and are fastened by upright bolts 20 to a corresponding carrier 21 at a location which is substantially midway along the length of that carrier 21. Each carrier 21 is of the same length as the other two carriers and extends substantially horizontally perpendicular, or at least transverse, to the direction A in substantially parallel relationship with the frame beams 1 and 3 and comprises a beam 22 of inverted channel-shaped cross-section, the uppermost web or base of said beam 22 being secured to the respective bracket 19 by the heads of the corresponding bolts 20 with the assistance of a fastening plate 23 that is interposed between the heads of said bolts 20 and the downwardly directed surface of the web or base of the beam 22 concerned. Each carrier 21 also comprises a second beam 24 which, again, is of inverted channel-shaped cross-section. However, the limbs of each beam 24 are considerably shorter than are the limbs of the co-operating beam 22 and it will be seen from FIG. 4 of the drawings that each beam 24 is nested between the limbs of the corresponding beam 22 in such a way that the free edges of the two limbs of the inner beam 24 register with the free edges of the adjoining limbs of the outer beam 22. Pairs of bolts 25 that extend substantially horizontally parallel to the direction A are entered through registering holes in the limbs of the outer and inner beams 22 and 24 of each carrier 21, at substantially regular intervals along the transverse length of that carrier 21, and thus secure the beams 22 and 24 firmly, but releasably, to one another. The bolts 25 also serve a second fastening function that will be referred to again below.

The top of each carrier 21 is provided, at two locations which are each spaced from the midpoint of the carrier concerned by substantially one-quarter of the total transverse length of that carrier, with corresponding substantially horizontal bearings 26 (FIGS. 1, 6 and 7) that define axes which are parallel or substantially parallel to the direction A. The bearings 26 are plain bearings and are secured to the uppermost webs or bases of the beams 22 of the corresponding carriers 21 by upright bolts 27 and co-operating clamping plates 28, each plain bearing 26 extending throughout the whole of the width, in the direction A, of the corresponding carrier 21. The effective length of each bearing 26 in the direction A is such that a high resistance is produced to forces which, during operation of the implement, tend torsionally to deform the carriers 21. Each plain bearing 26 comprises a central pivot pin 29 whose opposite ends project from the sleeve portion of that bearing and are turnably connected to the ends of corresponding arms 30. The arms 30 project obliquely upwardly from each pivot pin 29 towards the nearest frame beam 2 (see FIG. 6), the ends of said arms 30 which are remote from each pivot pin 29 being connected by a further parallel pivot pin 31 to a sleeve 32 at the lower end of a corresponding link portion 33. The sleeve 32 lies between said ends of the corresponding pair of arms 30 and the link portion 33 projects integrally upwardly therefrom towards a second integral sleeve 35. The second sleeve 35 turnably surrounds a pivot pin 34, that is parallel to the pivot pins 29 and 31, said pivot pin 34 having its opposite ends connected to the downwardly projecting limbs of a corresponding support 36 which is of inverted channel-shaped cross-section. One end of each support 36 has a substantially vertical plate 37 welded or otherwise rigidly secured to it, said plate 37 being in parallel or substantially parallel relationship with the direction A and being firmly but releasably secured to the upright web or base of the neighbouring frame beam 2 by bolts 38.

It will be apparent from FIGS. 3 and 6 of the drawings that each support 36 is inclined obliquely outwardly and upwardly, at a few degrees to the horizontal, from the corresponding frame beam 2, said support 36 being disposed above the corresponding carrier 21 (see FIGS. 1 and 7) so as to extend in the same general direction as that carrier although not actually parallel thereto. The downwardly directed limbs of each support 36 are interconnected, near the free ends of those limbs, by a pin 39 that extends substantially parallel to the direction A and which is located substantially, although not necessarily exactly, in vertical register with the pivot pin 29 of the corresponding underlying plain bearing 26. The two arms 30 of each pair are interconnected, at a short distance from the corresponding bearing 26, by a pin 40 which is again substantially horizontally parallel to the direction A. Each of the pins 39 and 40 is turnably surrounded by a corresponding sleeve 41 that lies between the two arms 30, or two support limbs, concerned and it will be seen in FIGS. 2, 3 and 6 of the drawings that each associated pair of sleeves 41 have loops at the opposite ends of a helical tension spring 42 anchoringly engaged around them. The loops at the ends of the spring 42 are maintained in substantially central positions along the co-operating sleeves 41 by further spacing sleeves 43 (FIGS. 6 and 7) that surround the sleeves 41 alongside said loops both in front of, and behind, those loops with respect to the direction A. The bottom of the lower sleeve 32 of each link portion 33 is provided with a downwardly projecting stop 44 which will, when required, co-operate with a neighbouring stop 45 which is fastened between the associated pair of arms 30 near to the link portion 33 concerned. The stops 44 and 45 are arranged to prevent the carriers 21 from moving too far downwardly away from the frame of the implement when the latter is in operation. The lower limbs of the frame beam 2 are replaceably provided with rubber or other resilient pads 46 which are designed to reduce both mechanical shocks and noise when the tops of the carriers 21 move upwardly towards contact with the frame of the implement when the latter is in use.

Each of the carriers 21 is provided with a corresponding row of rigid soil working tines 47 that are spaced apart from one another at regular intervals along the carrier concerned. The arrangement of the tines 47 on their three carriers 21 is, however, also such that, when the implement is viewed from the rear in a direction A (i.e. as seen in FIG. 3), the tines 47 are disposed in successive groups, each of which groups comprises three tines with each tine in each group fastened to a corresponding one of the three carriers 21. Each tine 47 is connected to the corresponding carrier 21 by being provided with a holder 48 which has a central substantially cylindrical portion 49 (FIG. 5) whose upper end bears against the lower surface of the web or base of the corresponding inner carrier beam 24 between the downwardly directed limbs of that beam. Each holder 48 also comprises a pair of diametrically opposed lugs 50 whose shapes can be seen best in FIG. 5 of the drawings from which it will be apparent that lower surfaces of the lugs 50 are arranged for co-operation with the previously discussed pairs of bolts 25 that secure the beams 22 and 24 of each composite carrier 21 to each other. Thus, it is only necessary temporarily to remove one pair of bolts 25 to enable one of the holders 48 to be released from its appointed position. The substantially cylindrical portion 49 of each holder 48 is formed with an inwardly directed lip at its upper end so that the central bore therethrough is of reduced diameter at this location. A fastening portion 51 at the upper end of each tine 47 bears against the inwardly directed lip that has just been mentioned and, in order to retain said fastening portion 51 against both axial and rotational displacement from its appointed position, its curved surface is formed with a flat-bottomed recess that is arranged for co-operation with an oblique surface on a corresponding cotter pin 52 which cotter pin has a screwthreaded end portion that receives a securing nut 53. It will be seen from FIG. 5 of the drawings that the recess in each tine fastening portion 51 which co-operates with the corresponding cotter pin 52 is located substantially midway between the uppermost and lowermost ends of that portion 51. The lowermost end of each tine fastening portion 51 is integrally connected to the upper end of a corresponding soil working portion 54 that projects downwardly therefrom into the soil when the implement is in use. The two portions 51 and 54 of each tine 47 are both straight and are arranged with their longitudinal axes in coincident relationship. The soil working portion 54 of each tine 47 is initially, at its upper end, of substantially circular cross-section, like the corresponding fastening portion 51, but, as one moves downwardly along the tapering soil working portion 54 towards the lowermost free end or tip thereof, the cross-section progressively changes and becomes substantially rhombic. It will be apparent from a comparison between FIGS. 4 and 5 of the drawings that the longer diagonal of the substantially rhombic cross-section is parallel or substantially parallel to the direction A while the shorter diagonal is perpendicular or substantially perpendicular ot that direction. Each of the four what would otherwise be substantially flat sides of the substantially rhombic cross-section part of the soil working portion 54 of each tine 47 is formed, throughout the greater part of its width, with a groove, said four grooves extending upwardly from the lowermost free end or tip of the portion 54 concerned to vanish, at the upper end of said part where the portion 54 is of basically circular cross-section. At least the leading edge or "corner", with respect to the direction A, of the part of each tine soil working portion 54 that is of substantially rhombic cross-section is formed as a flattened rib.

Plates 55 are welded or otherwise rigidly secured to the opposite ends of the rear frame beam 1 and are disposed in substantially vertically parallel relationship with one another and vertical or substantially vertical relationship with the direction A. The plates 55 are provided, close to their lower leading corners (see FIGS. 2 and 4), with substantially horizontally aligned stub shafts 56 which stub shafts define an axis that is parallel or substantially parallel to the frame beam 1. Arms 57 that extend generally rearwardly, with respect to the direction A, are turnable upwardly and downwardly about the two stub shafts 56 alongside the corresponding two plates 55. Each plate 55 is formed, towards its rearmost edge, with a curved row of, for example, four holes 60 that are equidistant from the axis which is defined by the stub shafts 56. Each arm 57 has a lug 59 on its upper edge and said lug is formed with a hole which is at the same distance from the axis which is defined by the stub shafts 56 as is each of the holes 60. The holes in the lugs 59 can be brought into register with chosen ones of the holes 60 by turning the arms 57 upwardly or downwardly about their stub shafts 56 and retaining bolts 58 are provided for entry through the holes in the lugs 59 and chosen ones of the holes to to maintain any angular position of the arms 57 about the axis which is defined by the stub shafts 56 that may be chosen. The arms 57 project some distance rearwardly behind the plates 55 and their rearmost ends carry substantially horizontally aligned bearings between which an open-work cage-formation roller 61 is mounted in a freely rotatable manner. The roller 61 extends throughout substantially the same working width as do the tined carriers 21 and performs the function of partially supporting the implement on the ground surface when it is in use, governing the maximum depth to which the tines 47 can penetrate into the soil, and of finally crushing or otherwise crumbling any lumps of soil that may have been left upon the ground surface by the foregoing tines 47. The roller 61 has a central axially extending support 64, that is preferably of tubular formation, to which support a plurality, such as five, of circular or substantially circular support plates 63 are secured, each support plate 63 being in substantially vertically disposed parallel relationship with its fellows and parallel or substantially parallel relationship with the direction A. Two of the support plates 63 are located close to the opposite axial ends of the roller 61. Each support plate 63 is formed, close to its periphery, with a plurality, such as twelve, of holes that are arranged in a circular row with said holes spaced apart from one another at regular angular intervals around the longitudinal axis of the roller 61. Elongate elements 62 that are of solid rod-like formation or, alternatively, tubular formation, are entered lengthwise through the substantially peripheral holes in the successive support plates 63 and are so arranged (see FIG. 1) as to extend helically around the longitudinal axis of the roller 61. An upright support 65 is provided midway across the transverse width of the leading frame beam 3 and has a forked coupling point at its uppermost end. Two pairs of lugs 66 that are formed with vertically extending slotted openings project forwardly from the leading frame beam 3 at locations which coincide with the opposite ends of that beam. The support 65 and lugs 66 afford a coupling member of the implement and can be employed in the manner that is shown somewhat diamgrammatically in FIGS. 1 and 2 of the drawings in connecting the implement frame to the three-point lifting device or hitch at the rear of an agricultural tractor or other operating vehicle. Tie beams 67 that diverge downwardly and rearwardly with respect to the direction A interconnect substantially the top of the support 65 and locations on the upper limb of the rear frame beam 1 which are spaced apart from one another in a horizontal direction that is perpendicular to the direction A and which substantially register with the junctions between the rear ends of the two beams 2 and the front of the rear beam 1. The tie beams 67 strengthen the connection of the support 65 to the leading frame beam 3.

In the use of the soil cultivating implement that has been described, its coupling member 65/66 is connected to the three-point lifting device or hitch at the rear of an agricultural tractor or other operating vehicle in the manner which is illustrated somewhat diagrammatically in FIGS. 1 and 2 of the drawings and the leading splined or otherwise keyed end of the rotary shaft 4 is placed in driven connection with the rear power take-off shaft of the same agricultural tractor or other operating vehicle through the intermediary of a telescopic transmission shaft, which is of a construction that is known per se, having universal joints at its opposite ends. Part of such a telescopic transmission shaft can be seen in FIGS. 1 and 2 of the drawings. It may be necessary, before work commences, to adjust the maximum working depth to which the tines 47 can penetrate into the soil and this is achieved by temporarily removing the retaining bolts 58 and turning the arms 57 upwardly or downwardly, as may be needed, about the stub shafts 56, maintaining the new setting by replacing the bolts 58 so as to co-operate with different holes 60. As the implement moves operatively in the direction A over land that is to be cultivated, the rotary drive that is applied to the leading end of the shaft 4 causes the three carriers 21, which are linked to said shaft 4 through the intermediary of the corresponding eccentric mechanisms 8, to move in such a way that the lowermost free ends or tips of the tines 47 which they bear execute the substantially circular paths of motion that are indicated by broken lines in FIG. 3 of the drawings, each such path being contained in a substantially vertical plane which also contains the longitudinal axis of the carrier 21 concerned and that is perpendicular or substantially perpendicular to the direction A. The dimensions of the eccentric mechanisms 8 are such that each of the circular paths that is shown in broken lines in FIG. 3 of the drawings has a diameter of substantially 70 millimeters. The spacing along the carriers 21 of the tines 47 in the three successive, in the direction A, rows thereof is such that, as will again be evident from FIG. 3 of the drawings, the strip of land that is worked by each group of three tines 27 overlaps the strip thereof that is worked by the or each immediately neighbouring group so that, in effect, the implement produces a single broad strip of worked soil whose width is substantially equal to the length of a single one of the carriers 21. As already mentioned above, the following freely rotatably roller 61 performs a final crumbling action upon any lumps of soil that may have been left upon the ground surface by the tines 47 and tends to level and gently compress the worked soil to produce a substantially flat and uniformly cultivated broad strip.

Each carrier 21 is supported substantially centrally along its length by a corresponding one of the three eccentric mechanisms 8 and also, from the frame of the implement, at distances from its center, by two pivotable joints each of which includes the corresponding pair of arms 30 and the corresponding link portion 33. The springs 42 partially support the carriers 21 from the implement frame and, together with the resilient pads 46, intensify the oscillatory motion of the carriers 21 that is produced by the eccentric mechanisms 8 which tends to improve the action of the tines 47 upon the soil, particularly when the implement is dealing with heavy soil. The simple construction of the pivotable joints is one which enables the carriers 21 strongly to resist forces which, during operation, tend torsionally to displace or deform them and, moreover, the pivotable joints enable the carriers 21 to rock to some extend about axes which are parallel or substantially parallel to the direction A which can enable any tines that may meet a firmly embedded obstacle, such as a rock, to deflect upwardly and avoid damage. The effectively opposed springs 42 which correspond to each carrier 21, in addition to partially supporting the weight of that carrier, assist in enabling the carrier 21 to move upwardly without jerking, particularly when an obstacle is to be avoided as has just been discussed. The splined or otherwise keyed end of the shaft 4 that projects rearwardly from the back of the hindmost frame beam 1 can, when required, be employed as a source of rotary power for the moving parts of some other implement, machine or tool that may be used in combination, or conjunction, with the soil cultivating implement that has been described. Generally speaking, a further telescopic transmission shaft of known construction, having universal joints at its opposite ends (not shown) will be required between the rear end of the shaft 4 and a rotary input shaft of such another implement, machine or tool.

Although certain features of the soil cultivating implement that has been described and/or that is illustrated in the accompanying drawings will be set forth in the following claims as inventive features, it is emphasised that the invention is not necessarily limited to those features and that is includes within its scope each of the parts of the soil cultivating implement that has been described, and/or that is illustrated in the accompanying drawings, both individually and in various combinations.

What we claim is:

1. A soil cultivating implement comprising a frame and soil working means mounted on said frame, said soil working means comprising at least one elongated tool carrier pivoted to said frame and eccentric driving means connected to said carrier that displaces said carrier in an orbital path about a horizontal axis, said carrier and said path extending transverse to the direction of travel, said carrier being interconnected to the frame by at least one freely pivotable joint that is spaced from said eccentric means.

2. An implement as claimed in claim 1, wherein an eccentric mechanism is connected to said carrier substantially midway along the length thereof.

3. A soil cultivating implement comprising a frame and soil working means mounted on said frame, said soil working means comprising a plurality of spaced apart elongated tool carriers that are interconnected to the frame by respective eccentric mechanisms intermediate the lengths thereof, said mechanisms being positioned one behind the other and connected to move the carriers in respective orbital paths about substantially horizontal axes, each carrier being interconnected to the frame by freely pivotal joints that are actuated by said mechanisms during operation.

4. An implement as claimed in claim 3, wherein each carrier extends transverse to the direction of travel of the implement.

5. An implement as claimed in claim 4, wherein there are three carriers located one behind the other with respect to the direction of travel and said three carriers have substantially equal lengths.

6. An implement as claimed in claim 4, wherein said eccentric mechanisms are mounted on a common shaft.

7. An implement as claimed in claim 6, wherein said common shaft extends substantially horizontally parallel to the direction of travel and parts of the eccentric mechanisms are angularly spaced apart from one another around the longitudinal axis of the common shaft at angles of about 120°, as regards the eccentricities of said parts.

8. An implement as claimed in claim 7, wherein each eccentric mechanism comprises a disc that has at least one cavity.

9. An implement as claimed in claim 6, wherein each eccentric mechanism comprises a central eccentric disc, a bearing surrounding said disc and a ring surrounding said bearing, said ring being axially enclosed between blanking plates each of which has a diameter not less than the diameter of said mechanism.

10. An implement as claimed in claim 9, wherein two neighboring eccentric mechanisms have central eccentric discs that are rotatable together about a common axis, a single integral blanking plate that is common to both of said mechanisms being positioned between said two mechanisms.

11. An implement as claimed in claim 6, wherein each pivotable joint between the carrier and said frame includes a pivot that resists torsional displacement and deformation of said carrier.

12. An implement as claimed in claim 11, wherein each carrier is pivoted to the frame by two joints that are spaced apart in opposite directions from the carrier's midpoint, each joint having at least one arm that is inclined upwardly and inwardly towards the center of the implement from said carrier, stops positioned to limit the turnability of each arm in at least one direction.

13. An implement as claimed in claim 12, wherein each joint is associated with a spring that limits the movement of said carrier in at least one direction.

14. An implement as claimed in claim 13, wherein said spriing is a tension spring arranged to limit the downward movement of the carrier relative to the frame.

15. An implement as claimed in claim 14, wherein said spring is positioned between said arm and a support mounted on the frame, said arm and support being pivotally interconnected.

16. An implement as claimed in claim 15, wherein said spring is connected to the arm adjacent the location of the pivot connection of said arm to the carrier.

17. An implement as claimed in claim 16, wherein the spring is connected to said support adjacent an outer end thereof, the inner support end being connected to the frame.

18. An implement as claimed in claim 14, wherein said frame mounts resilient material adjacent the carriers to prevent contact with said frame.

19. An implement as claimed in claim 6, wherein soil working tines are spaced apart from one another at substantially regular intervals along the lengths of the carriers, said tines being positioned on said carriers in groups of three, when viewed in the direction of travel.

20. An implement as claimed in claim 19, wherein each carrier comprises two beams of channel-shaped cross-section, an inner one which has limbs that are shorter than those of the other outer beam, said one beam being nested between the limbs of said outer beam.

21. An implement as claimed in claim 20, wherein said tines are secured in holders that are held between the limbs of said inner and outer beams.

22. An implement as claimed in claim 21, wherein each holder comprises lugs engaged by bolts that secure said holder and also releasably secure said two beams together.

23. An implement as claimed in claim 22, wherein each holder has a thickness, in a direction that is perpendicular to the length of the carrier, which is about the same as the distance between the limbs of said inner beam.

24. An implement as claimed in claim 22, wherein each holder comprises a substantially cylindrical portion with a central bore, said cylindrical portion mounting said lugs at diametrically opposed positions.

25. An implement as claimed in claim 24, wherein each tine has a fastening portion which is releasably secured in said bore by a cotter member.

26. An implement as claimed in claim 25, wherein a surface of each tine fastening portion is arranged to co-operate with a corresponding cotter member and said surface is located substantially midway between the opposite ends of the fastening portion.

27. An implement as claimed in claim 26, wherein each tine comprises a soil working portion and a lower part of that portion is substantially rhombic in cross-section, the longer diagonal of which is substantially parallel to the direction of travel.

28. An implement as claimed in claim 4, wherein a roller is positioned to the rear of the carriers and said roller is displaceable upwardly and downwardly relative to said frame, means retaining said roller at any chosen one of a plurality of different levels relative to the frame.

29. A soil cultivating implement comprising a frame and soil working means comprising a plurality of spaced apart elongated tool carriers that are interconnected to the frame by respective eccentric mechanisms intermediate the lengths thereof, said mechanisms being positioned one behind the other and connected to move the carriers in respective orbital paths about substantially horizontal axes, each carrier being linked to the frame by pivotal joints located at each side of the corresponding mechanism, each joint comprising an arm pivotally linking one side of the carrier to the frame and spring means that suspend the carrier from said frame, said driving means moving the carrier upwardly and downwardly and the soil working tools on said carrier being moved through oribtal paths to work the soil.

30. An implement as claimed in claim 29, wherein said carriers are suspended below said frame by respective tension springs.

* * * * *